United States Patent [19]

de Monterey et al.

[11] 4,300,954

[45] Nov. 17, 1981

[54] FLUSHING PROCESS FOR PIGMENTS

[75] Inventors: Francis de Monterey, Hopkins; Bharat J. Adhia; David M. Johnson, both of Holland, all of Mich.

[73] Assignee: BASF Wyandotte Corporation, Wyandotte, Mich.

[21] Appl. No.: 109,334

[22] Filed: Jan. 3, 1980

[51] Int. Cl.³ .................. C08J 3/20; C09D 17/00
[52] U.S. Cl. ..................... 106/309; 106/235; 106/262; 106/285; 106/308 M; 106/193 R; 106/198; 106/308 F; 260/34.2
[58] Field of Search .......... 106/262, 285, 235, 309, 106/193 R, 198, 308 F, 308 N, 308 M; 260/34.2

[56] References Cited

U.S. PATENT DOCUMENTS

| 2,378,786 | 6/1945 | Osborne | 106/309 |
| 2,637,711 | 6/1950 | Auer | 260/29.20 A |
| 2,907,670 | 10/1959 | Katz et al. | 106/262 |
| 2,929,723 | 3/1960 | Kebrich et al. | 106/262 |
| 3,437,624 | 4/1969 | Dawn et al. | 260/29.2 |
| 3,526,391 | 9/1970 | Church | 259/4 |
| 3,980,488 | 9/1976 | Barrington et al. | 106/262 |
| 4,227,936 | 10/1980 | Ossuvald et al. | 106/262 |

OTHER PUBLICATIONS

Mead, "The Encyclopedia of Chemical Process Equipment", Reinhold, pp. 295 & 296.

Primary Examiner—Allan Lieberman
Attorney, Agent, or Firm—Bernhard R. Swick

[57] ABSTRACT

This invention relates to a method for producing a pigment-organic vehicle product, commonly referred to as "flush" by those versed in the art, which comprises forcing a pigment-containing aqueous pulp-organic vehicle mixture through a chamber comprising a set of at least two adjoining partial cylindrical surfaces, said chamber having defined at one end thereof at least one axial opening and at least one second opening spaced from the axial opening. The mixture is forced through the chamber and axial opening by a set of at least two rotating helical surfaces whereby the product is extruded through the axial openings. The water exits from the chamber through the second opening or openings.

12 Claims, 3 Drawing Figures

FLUSHING PROCESS FOR PIGMENTS

BACKGROUND OF THE INVENTION

1. Field of the Invention

This invention relates to new and useful improvements in pigment dispersions. It relates particularly to the transfer of a pigment from an aqueous pulp or presscake directly into organic vehicles by an operation known to those skilled in the art as flushing.

2. Description of the Prior Art

Historically, organic pigments have been made by coupling in a dilute aqueous slurry, which is then filtered in a filter press to concentrate the pigment. The presscake is either dried to obtain a dry color, or "flushed" to transfer the pigment particles from the aqueous phase to a non-polar oil or resin phase. This assists in keeping pigment particles non-agglomerated and easier to dilute for ultimate use in inks or coatings. Flushing has been carried out for many decades by mixing pigment presscake with suitable types and quantities of "vehicle" which may be an oil, or a solution of resin or resins and other additives in a solvent. In the prior art, the transfer was effected by merely kneading the presscake and vehicle together until substantially all the water has separated. These were generally batch-type operations employing sigma-blade mixers similar to dough mixers or Banbury mixers. Such processes are very energy intensive and labor intensive since the flushers have to be tilted to remove water from time to time as it breaks, i.e., becomes freed of pigment which has transferred to the oil phase. Also, the final paste or dispersion is often extremely viscous and must be removed manually by shoveling or scraping with hoes and other suitable manual tools.

Accordingly, it is a purpose of the instant invention to provide for flushing a pigment which may be carried out continuously and completely automatically.

Some prior art flushing processes are disclosed in the following patents.

| U.S. Pat. No. | Issue Date | Inventor | Assignee |
|---|---|---|---|
| 3,980,488 | 9/14/76 | Barrington et al | Sherwin-Williams |
| 2,378,786 | 6/19/45 | Osborne | Unassigned on Face |
| 2,637,711 | 5/5/53 | Auer | Unassigned on Face |

U.S. Pat. No. 3,980,488—Barrington et al—Discloses flushing an organic pigment from an aqueous slurry or presscake into a hydrophobic organic vehicle in conventional equipment such as a homogenizer followed by separating the water from the flushed mass of pigment and vehicle.

U.S. Pat. No. 2,378,786—Osborne—Discloses mixing a pigment slurry with oil, passing the mixture through a colloid mill followed by passing through a heat exchanger and dewatering on a heated belt.

U.S. Pat. No. 2,637,711—Auer—Discloses mixing benzidine yellow and water in a pony mixer until a slurry is formed. The slurry is then homomixed for 30 minutes and colloid milled to complete the pigment deflocculation. It is suggested in the patent that a Gaulin homogenizer be employed for dispersion.

In co-pending U.S. Patent Application Ser. No. 109,357, filed Jan. 3, 1980 entitled *Flushing process for Pigments* a pigment-containing aqueous pulp-organic vehicle mixture is prepared by forcing the aqueous pulp through a conduit and injecting the vehicle into the conduit containing the aqueous pulp. The mixture is then homogenized, subjected to further mixing where necessary or desirable, and transferred to a traveling horizontal perforated surface whereby some of the water drains from the mixture through the perforations. This effectively removes that water which is most easily removed, thus reducing the amount of water which must be removed in subsequent operations. Temperature control is maintained throughout the process through the use of conventional heat exchangers. The mixture is then forced through a cylindrical chamber having defined at one end thereof an axial opening and at least one second opening spaced from said axial opening. The mixture is forced through the chamber and axial opening by a rotating helical surface whereby the product is forced through the axial opening and water is squeezed from the mixture. The water then exits from the chamber through the second opening. The product is then standardized in a conventional container such as a tank by adding the correct amount of additional vehicle to obtain the desired proportion of pigment and vehicle. In order to reduce the amount of vehicle to be added batch-wise in the standardization tank or container, a pre-determined amount of vehicle may be added to the product by injection after it exits from the axial opening of the chamber. This may then be mixed by a suitable mixer prior to transfer to the standardization tank.

SUMMARY OF THE INVENTION

This invention relates to a method for producing a pigment-organic vehicle product which comprises forcing a pigment-containing aqueous pulp-organic vehicle mixture through a chamber comprising a set of at least two adjoining partial cylindrical surfaces, the chamber having defined at one end thereof at least one axial opening and having at least one second opening spaced from said axial opening. The mixture is forced through the chamber and axial opening by a set of at least two rotating helical surfaces whereby the product is forced through the axial opening and water is squeezed from the mixture. The helical surfaces may be co- or counter rotating. The water then exits from the chamber through the second opening.

In a preferred embodiment of this invention the aqueous pulp-organic vehicle mixture is prepared by metering the vehicle into the aqueous pulp in a suitable container such as a hopper or the conduit from a hopper to the chamber.

This invention has the advantage that the transfer or flushing operation may be completely carried out through the action of forcing the aqueous pulp-organic vehicle mixture through the chamber and axial opening without any substantial premixing of pulp and vehicle, i.e., in most instances it eliminates the use of homogenizers and other pre-mixers. Further, there is no need to previously remove that water which is most easily removed with filters and/or other such apparatus. In fact, it is possible to effect the flushing operation by adding vehicle direct to an aqueous unfiltered slurry and forcing it through the above described chamber. However, this method is also applicable to conventional presscake from a filter press. Applicant's process has the advantage of simplicity and obviously is much simpler than one requiring various complex mixing and homogenizing operations.

DESCRIPTION OF THE DRAWINGS

The accompanying drawing is a representation of a preferred embodiment of the invention wherein like numerals apply to like parts in the various figures. It is to be understood that various changes or modifications may be made in the drawings without departing from the spirit and scope of the appended claims.

DESCRIPTION OF THE PREFERRED EMBODIMENT

Figure 1:
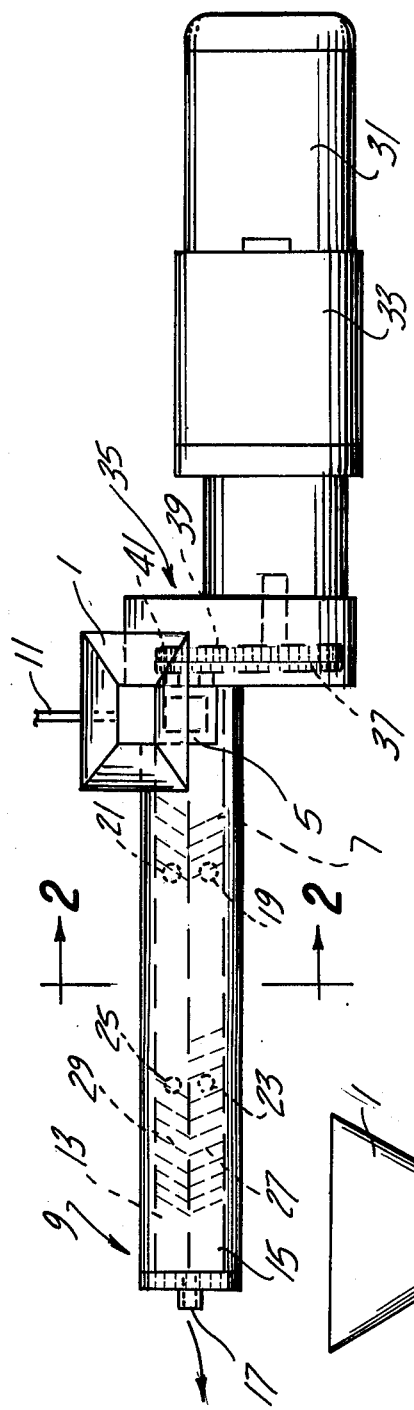
FIG. 1 is a schematic representation of a twin screw apparatus which may be used in carrying out the method of the present invention.
Figure 3:
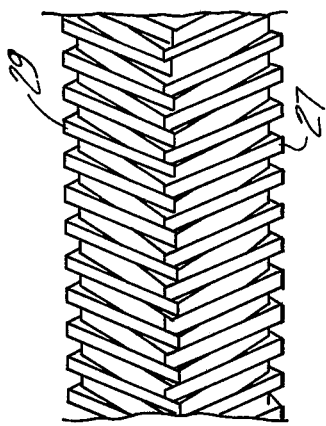
FIG. 3 is an enlarged detail view of the intermeshing screws employed in the extrusion apparatus of FIG. 1.
Figure 2:
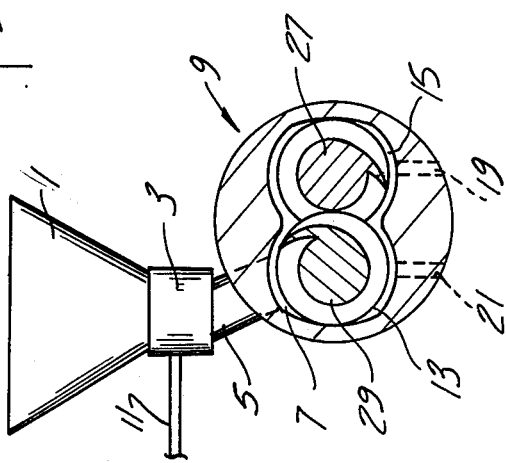
FIG. 2 is a sectional view along the line 2—2 of FIG. 1.

The instant invention provides a novel and unobvious process for dispersion of a pigment, such as a diarylide yellow pigment in a hydrophobic organic vehicle. An organic vehicle is added to an aqueous pulp of the pigment whereby the aqueous pulp is thoroughly mixed with the organic vehicle and the organic pigment is transferred from the aqueous pulp to the organic vehicle, and a major portion of the water in the pulp separates. The water is removed from the pigment-organic vehicle mixture by forcing the mixture through a chamber, and subsequently through an axial opening, by means of a pair of rotating helical surfaces. While the method of this invention is particularly useful with diarylide yellow pigments the invention is also applicable to other pigments such as phthalocyanine blue, Red Lake C and Chrome Yellow. Actually, this process is suitable for almost any pigment.

While one of the advantages of the instant invention lies in the elimination of various mixing and water removal operations, in some instances it may be desirable to combine the method disclosed in this invention with that disclosed in copending application U.S. Patent Ser. No. 109,357. More specifically, a set of at least two adjoining partial cylindrical surfaces and a set of at least two rotating helical surfaces are substituted for the single helical surface and the single cylindrical surface of that invention. For example, one or more of the following pretreatments may be advantageously employed, i.e., the pigment containing aqueous pulp-organic vehicle mixture may be prepared by forcing the aqueous pulp through a conduit and injecting the vehicle into the conduit and aqueous pulp mixture. The mixture is then homogenized. Subjected to further mixing where necessary or desirable, and transferred to a traveling horizontal perforated surface whereby some of the water drains from the mixture through the perforations which effectively removes that water which is most easily removed. This product is then forced through the chamber which comprises at least two adjoining partial cylindrical surfaces and the axial opening by at least two rotating helical surfaces. It is preferred that these helical surfaces counter-rotate. As with U.S. Patent application Ser. No. 109,358, additional vehicle may be added to the product after it exits from the axial opening, in order to achieve the desired pigment-vehicle ratio in the final product. The vehicle is mixed in a suitable mixer.

With reference now more particularly to the drawing, the aqueous pulp of the pigment is fed through the hopper 1, metering device 3, and conduit 5, into the chamber 7 of the extrusion device generally indicated at 9. This may be an aqueous unfiltered slurry containing by weight as little as 2 percent solids, or a presscake containing as much as 50 percent solids. The vehicle is added to the aqueous pulp through conduit 11 by means of metering device 3 which is a conventional metering device or metering pump well known to those skilled in the art. In general, the weight ratio of pigment to vehicle is about 1:3 to 3:1 with about 0.5:1 to 1.2:1 preferred.

Any of the hydrophobic organic vehicles that are commonly used in printing ink and coating compositions may be employed in the method and composition of this invention. Such vehicles are represented by drying, semi-drying, and non-drying oils, litho varnishes, mineral oils, rosins, dimerized rosins, esters of dimerized rosins, aliphatic and aromatic hydrocarbon resins, alkyl aromatic resins, maleic and fumaric-modified rosin, phenolic rosin, phenolic-modified rosin esters, alkyd resins, urethane-modified alkyds, polyolefins, polyindenes, cumarone/indene resins, phthalate esters, castor oil, fish oil, linseed oil, gloss varnishes, and various heat-set, quick set and steam set vehicle systems. A preferred vehicle is mineral oil. The proportion of aqueous pulp to vehicle will have a very wide range depending upon the concentration of pigment in the vehicle that is ultimately desired as well as upon the amount of water in the aqueous pulp.

The chamber 7 comprises a pair of adjoining partial cylindrical surfaces at 13 and 15. At one end of chamber 7 an axial opening 17 of a diameter smaller than that of either said cylindrical surfaces 13 and 15 is provided. While generally a single axial opening is shown and preferred, it is possible that in some instances it may be desirable to have more than one such axial opening 17. At least one second opening 19 and preferably a plurality of such openings such as 21, 23 and 25 are provided in said chamber preferably along the lower portion thereof.

The aqueous pulp-organic vehicle mixture is forced through the chamber 7 and opening 17 by means of a pair of rotating helical surfaces provided by intermeshed twin screws 27 and 29 whereby the product is extruded through the axial opening 17. Water is squeezed from the mixture due to the shearing nature of the rotating helical surfaces through said second openings 19, 21, 23 and 25. The number of such second openings will depend on many factors such as the size of the extrustion apparatus, the pigment to be processed, the amount of water present in the pigment initially, etc.

In order to facilitate removal of the water from the pigment-vehicle product, vacuum may be applied to the second openings 19, 21, 23 and 25. Vacuum may also be applied to the axial opening 17 or openings. Ideally, the product exiting from axial opening 17 should contain from about 1 to 7 percent water and about 5 to 50 percent pigment.

Twin screws 27 and 29 are driven by a conventional driving mechanism illustrated more or less schematically in FIG. 1. This mechanism consists of a suitable prime mover, such as an engine or electric motor 31, a suitable transmission and control apparatus 33, a gear mechanism indicated generally at 35 which may consist of gears 37, 39 and 41 with possible intermediate gears, pinions, etc., not shown. Gears 39 and 41 are mounted on the shafts of screws 27 and 29 thereby rotating the intermeshing screws.

From the foregoing it will be appreciated that the instant invention has many advantages, among which are simplicity of operation, savings of time, labor and energy and the provision of a continuous process and resulting uniformity of the emerging product.

The embodiments of the invention in which an exclusive property or privilege is claimed are defined as follows:

1. A method of producing a pigment-hydrophobic organic vehicle product which comprises forcing a pigment-containing aqueous pulp-hydrophobic organic vehicle mixture having proportions of pigment to vehicle up to about 3:1 through a chamber comprising a set of at least two adjoining partial cylindrical surfaces, said chamber having defined at one end thereof at least one axial opening and having at least one second opening spaced from said axial opening, said mixture being forced through said chamber and said axial opening by a set of at least two rotating helical surfaces whereby water is squeezed from said mixture and exits through said second opening and said product is forced through said axial opening.

2. The method of claim 1 wherein a plurality of said second openings is employed.

3. The process of claim 1 wherein said helical surfaces are intermeshed and counter rotate.

4. The method of claim 1 wherein a vacuum is applied to said second openings.

5. The method of claim 1 wherein a vacuum is applied to said axial opening.

6. The method of claim 1 wherein said vehicle is mineral oil.

7. The method of claim 1 wherein the proportions of pigment to vehicle range from about 3:1 to 1:3 by weight.

8. The method of claim 1 wherein the proportions of pigment to vehicle range from about 0.5:1 to 1.2:1 by weight.

9. The method of claim 1 wherein said aqueous pulp is an unfiltered aqueous slurry.

10. The method of claim 1 wherein said aqueous pulp is a filter presscake.

11. In the method of producing a pigment-hydrophobic organic vehicle product which comprises forcing a pigment-containing aqueous pulp through a conduit, injecting said vehicle into said conduit and said aqueous pulp in a proportion whereby the pigment to vehicle ratio is up to about 3:1, homogenizing said mixture and squeezing water from said mixture, the improvement wherein said squeezing step comprises forcing said mixture through a chamber comprising a set of at least two adjoining cylindrical surfaces said chamber having defined at one end thereof at least one axial opening and having at least one second opening spaced from said axial opening, said mixture being forced through said chamber and said axial opening by a set of at least two rotating helical surfaces whereby water is squeezed from said mixture and exits through said second opening, and said product is forced through said axial opening.

12. In the method of producing a pigment-hydrophobic organic vehicle product which comprises forcing a pigment-containing aqueous pulp through a conduit, injecting said vehicle into said conduit and said aqueous pulp in amount to provide a ratio of pigment to vehicle up to about 3:1, homogenizing the resulting mixture, removing a portion of the water from the mixture by supporting said mixture on a travelling horizontal perforated surface whereby said portion of the water drains from said mixture through said perforations, and squeezing water from said mixture, the improvement wherein said squeezing step comprises forcing said mixture through a chamber comprising a set of at least two adjoining cylindrical surfaces said chamber having defined at one end thereof at least one axial opening and at least one second opening spaced from said axial opening, said mixture being forced through said chamber and said axial opening by a set of at least two rotating helical surfaces whereby water is squeezed from said mixture and exits through said second opening, and said product is forced through said axial opening.

* * * * *